United States Patent [19]

Beane

[11] Patent Number: 4,500,881
[45] Date of Patent: Feb. 19, 1985

[54] INDUCTIVELY-COUPLED SIGNALLING SYSTEM

[75] Inventor: Michael J. Beane, Apollo Beach, Fla.

[73] Assignee: Liquidometer Corporation, Tampa, Fla.

[21] Appl. No.: 422,366

[22] Filed: Sep. 23, 1982

[51] Int. Cl.³ .................. H04Q 9/12; H01R 11/30
[52] U.S. Cl. .................. 340/825.73; 340/825.76; 340/52 F; 340/532; 339/12 R
[58] Field of Search .................. 340/825.73, 825.54, 340/825.06, 52 F, 532, 825.74, 825.76, 870.31; 339/12 R; 307/10 R

[56] References Cited

U.S. PATENT DOCUMENTS

| | | | |
|---|---|---|---|
| 3,808,577 | 4/1974 | Mathauser | 339/12 R |
| 4,027,286 | 5/1977 | Marasko | 340/825.73 |
| 4,459,590 | 7/1984 | Saulnier | 340/825.54 |

Primary Examiner—Donald J. Yusko
Attorney, Agent, or Firm—H. Gibner Lehmann; K. Gibner Lehmann

[57] ABSTRACT

An inductively-coupled signalling system having multiple waveforms, for exchanging information between a vehicle and a storage facility, said system including a safety, separable signal-coupling device comprising a signal-transmitting coil carried in a housing and disposed at an accessible location at or on the vehicle, and a signal-receiving coil carried by a cable having a second housing, said cable leading to a signal-receiving and deciphering means located at the storage facility. The two housings of the coupling device are adapted for juxtaposition to each other so as to locate the coils thereof in inductive relation. A magnetic keeper part on one of the housings and a magnet part on the other housing releasably retain the housings in operative relation when the coupling device is in use. The receiving coil housing constitutes almost a complete magnetic shield for the receiving coil so as to minimize stray pick-up of spurious signals. In addition, the magnet and keeper parts are force-release responsive so as to permit virtually instantaneous non-destructive separation of the housings in the event that the vehicle is inadvertently driven off while the housings are still operatively coupled.

41 Claims, 13 Drawing Figures

INDUCTIVELY-COUPLED SIGNALLING SYSTEM

BACKGROUND

This invention relates generally to communication or signalling systems for fuel-handling facilities, and more particularly to systems of this type which are adapted to monitor a number of different parameters relating to transfer (as of petroleum) from storage tanks of a stationary facility, to one or more vehicles.

Conventional monitoring systems for sensing the various functions that are associated with fuel or petroleum-carrying vehicles heretofore did not involve multiple waveforms, and also usually employed direct-contact sockets and plugs that use cooperable spring fingers or contacts which are mated with one another when the connector is placed in use. Such arrangements presented a number of problems from both the reliability standpoint and the safety standpoint. Normally the spring contacts in such connectors are plated with a non-corroding metal such as silver or gold, in order to have a good connection between the parts after prolonged use, especially for unfavorable environments characterized by dampness, excessive heat or cold or in corrosive surroundings such as areas exposed to salt spray or other reactants like smoke, soot, sulphur and the like; but even so, failures occurred due to the scraping action of the connection, deformation of the springs, etc.

In addition, where conventional contacts are employed there always exists the danger of sparks arising from the make-and-break nature of the joint. If gasoline or other volatile liquid such as liquefied natural gas is being transferred, such sparks can represent a distinct and very serious hazard.

It is virtually impossible to prevent the contact areas of such connectors from gradually deteriorating with use, due to the abrasion of the plated material, or the physical damage occurring at the spring part itself. Even where silver is employed, tarnishing occurs after a period of time elapses, diminishing the integrity of the connector.

Where connectors of the push-on type are involved, damage is likely to occur if care is not exercised by the operator in installing or removing the one part of the connector. Such devices are often quite susceptible to damage from carelessness, as well as where excessive strain is put on a wire cable while the connector plug is still in place. Also, the possibility always exists that the vehicle might be driven off inadvertently with the connector plug still in operative position, giving rise to permanent damage of the unit. Repair or replacement of such connectors is both timeconsuming and costly, and represents an unnecessary expense, especially if such replacement necessitates a degree of down time for the particular vehicle being serviced. Prior signalling systems in many instances had limitations as to the number and type of indications which could be given, and reliability was considered inadequate when taking into account the large losses that could be incurred as a consequence of equipment or operator error.

SUMMARY

The above disadvantages and drawbacks of prior data communications systems for fuel-carrying vehicles are obviated by the present invention, which has for one object the provision of a novel and improved, inductively-coupled data exchange system which is both simple in operation and reliable over extended periods of use.

A related object of the invention is to provide an improved, especially safe data exchange system as above characterized, wherein the hazards associated with conventional make-and-break contacts in a separable connector are virtually completely eliminated.

Still another object of the invention is to provide an improved data exchange system as above set forth, that minimizes the likelihood of damage to the connector in the event that the vehicle is inadvertently driven off while the separable parts of the connector are still in place and operatively joined.

Yet another object of the invention is to provide an improved system of the kind indicated, which will undergo little or no deterioration over extended periods of use, or in corrosive or unfavorable environments, such as areas adjacent the ocean or in regions of smog, soot, dust, or sulphur-containing atmospheres.

A still further object of the invention is to provide an improved system as above characterized, wherein the possibility of interference between the unit and adjacent units, or with other stray magnetic fields is virtually completely eliminated, thus increasing the reliability of the monitoring system and reducing the possibility of erroneous readings which might lead to overfilling, spillage, etc. The existence of such conditions represents a distinct hazard to both the drivers of the vehicles and the operators of the facility.

The above objects are accomplished by an inductively-coupled signalling system for exchanging information between a vehicle and a storage facility, having a signal-transmitting means at the vehicle and a safety, separable, signal-coupling induction device comprising a signal-transmitting coil carried in a housing and preferably disposed at an accessible location on the vehicle, in conjuntion with a signal-receiving coil connected to a cable in a second housing. The cable leads to a signal-receiving means that is disposed at the storage facility. The two housings are adapted for juxtaposition to each other so as to permit a magnetic or inductive coupling between the coils to occur. Mutually attractive holding means are provided on the housings, comprising a magnetic keeper part on one housing and a magnet part on the other. The re- ceiving-coil housing constitutes a substantially complete magnetic shield for the coil, to minimize stray pick-up of spurious signals. In addition, the magnet and keeper parts are force-release responsive so as to permit virtually instantaneous, non-destructive separation of the housings in the event that the vehicle is inadvertently driven off while the housings are still coupled.

The arrangement is such that no make-and-break type contacts are needed between the cable which extends to the storage facility and the vehicle. Accordingly, any danger due to sparks possibly causing an explosion is virtually eliminated. Also, there is eliminated the problem of degeneration of contact fingers from either arcing or corrosion. This has been of concern where prior monitoring systems were employed in corrosive atmospheres.

The objects of the invention are further accomplished by providing at the vehicle a device for generating waveforms, and means for selecting pairs of said waveforms to correspond to predetermined desired signals. Such waveforms are impressed on the transmitting coil at the vehicle. At the storage facility, the signal-receiving means and unscrambler comprises a waveform decoder, and control devices such as relays which can operate suitable signal means to provide the desired indications to the operating personnel. As mentioned above the connector, since it is force-release responsive, eliminates the likelihood of suffering damage in the event that the vehicle is inadvertently driven off by an unthinking driver, with the connector still coupled.

Still other features and advantages will hereinafter appear. In the accompanying drawings, illustrating a preferred embodiment of the invention:

FIG. 7 is a detailed schematic diagram of the transmitter portion of the system.

The section of FIG. 1 is taken on the line 1—1 of FIG. 2.

In accordance with the present invention there is provided a unique, inductively-coupled shielded safety connector for exchanging information between a waveform generator on the vehicle and a waveform receiver at the storage facility. A quick, overall comprehension of the invention can be had by first referring to FIGS. 5 and 6, wherein the block diagrams thereof show generally the concept of the inductively-coupled data transmission system, arranged for the exchange of information between a vehicle and petroleum storage facility, or other product storage facility.

Figures 4, 5:
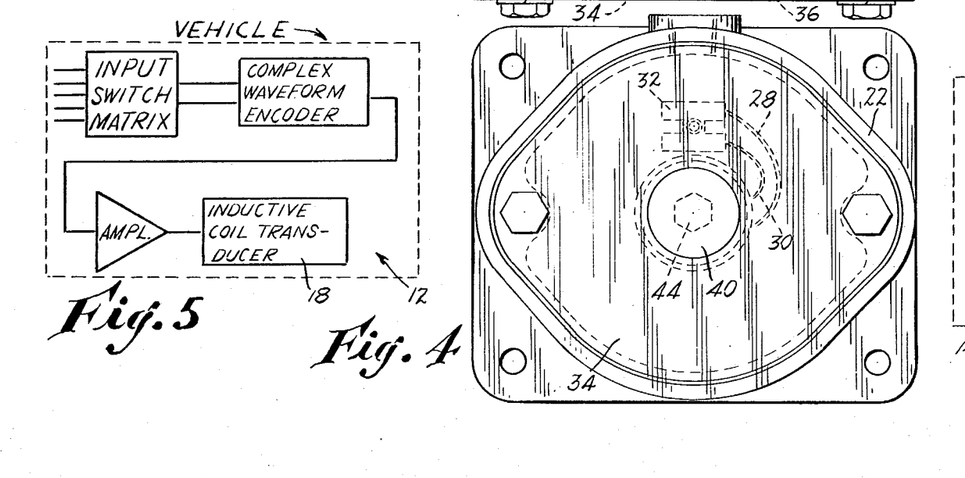
FIG. 4 is a rear elevational view of the connector part illustrated in FIG. 3.
FIG. 5 is a simplified block diagram of the transmitting components and circuitry.
Figure 6:
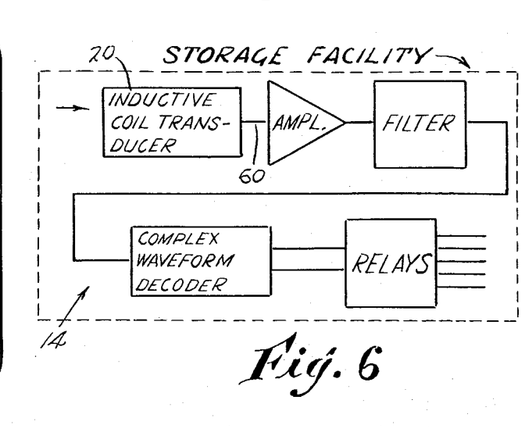
FIG. 6 is a simplified block diagram of the receiving components and circuitry.

FIG. 5 shows a waveform transmitting means or unit 12 located at the vehicle, whereas FIG. 6 illustrates a waveform receiving means or unit 14 as being at the storage facility. Together they are adapted to provide information relating to various parameters involved with the transfer of fuel or other product from the facility to the vehicle.

By way of example, the parameters could include the prevention of tank overfill, proper setting of the vehicle brakes, proper attachment of the vapor recovery hose, securement of the liquid fill hose, open or closed position of vents, odometer reading on the vehicle, and existence of a compartment-empty condition prior to filling as well as various combinations of the above.

In FIG. 5 the blocks constituting the transmitter means of the invention, which creates the waveforms that are to be deciphered or decoded, are labelled "input switch matrix", "complex waveform encoder", "amplifier", and "inductive coil transducer", the latter being the energy radiating means. In operation, the input switch matrix receives digital information from multiple lines. Such information can be in the form of switch closures to ground or to a common lead, or else other signals such as the outputs of various gates or buffers. The complex waveform encoder can produce pairs of variously related sine waves for each possible condition on the input lines, these being amplified in the driver or amplifier which feeds the transmitting coil or transducer.

In the receiver of FIG. 6, the composite sine wave signal is picked up by the "inductive coil transducer" or energy receiving coil and fed through the "amplifier" to the "filter", from which it goes to the "complex wave decoder" to produce digital information that is then fed to the "relays", which in turn generate digital output information on the output lines, five of which are shown by way of example.

Figures 1, 2, 3:
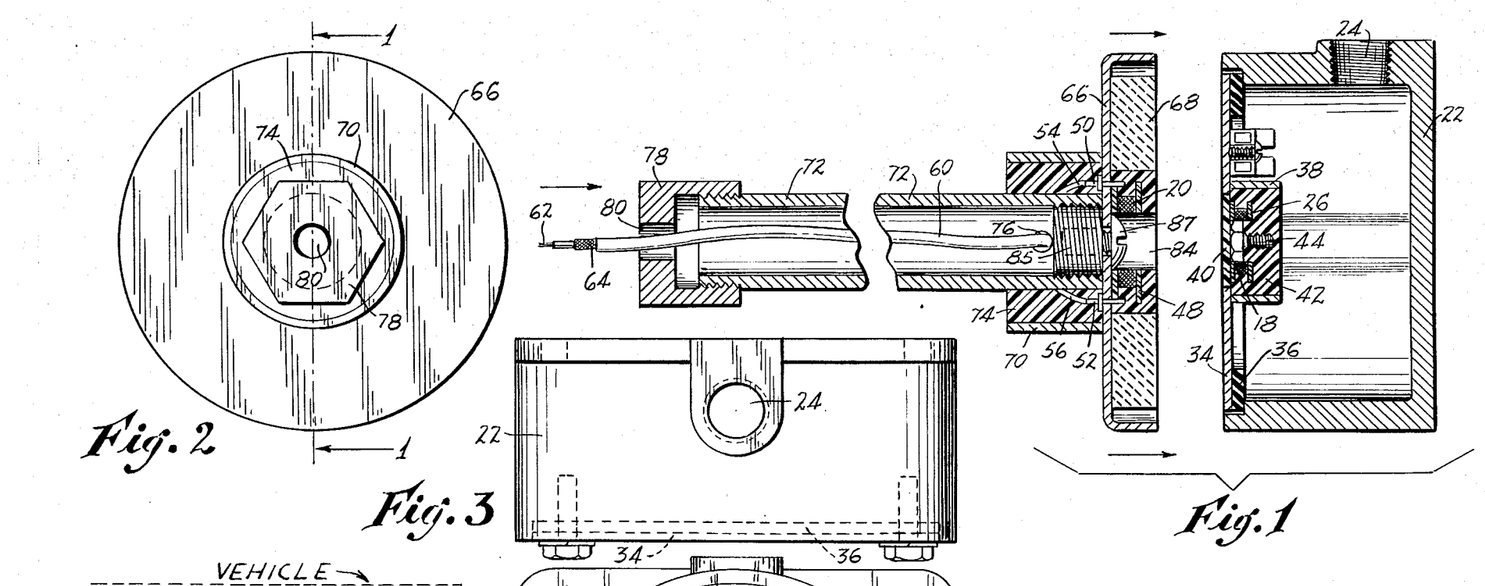
FIG. 1 is an axial sectional view, in separated condition, of the improved magnetically-coupled connector of the signalling system of the invention, showing the transmitting coil disposed on one part of the connector and the receiving coil on the other part.
FIG. 2 is a left end elevational view of the connector part that carries the receiving coil, in FIG. 1.
FIG. 3 is a top plan view of the connector part which carries the transmitting coil.
Figure 1:
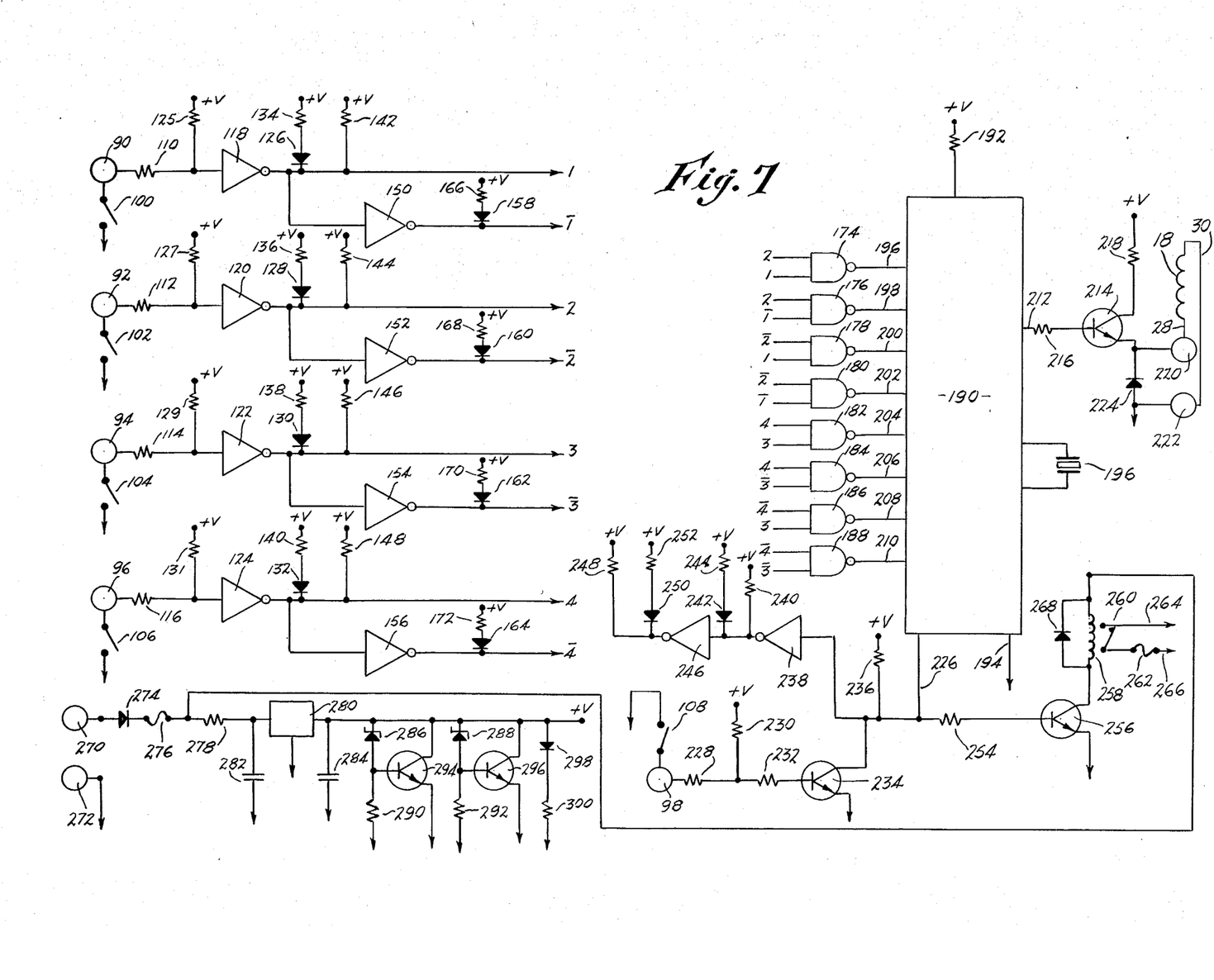
Figure 9:
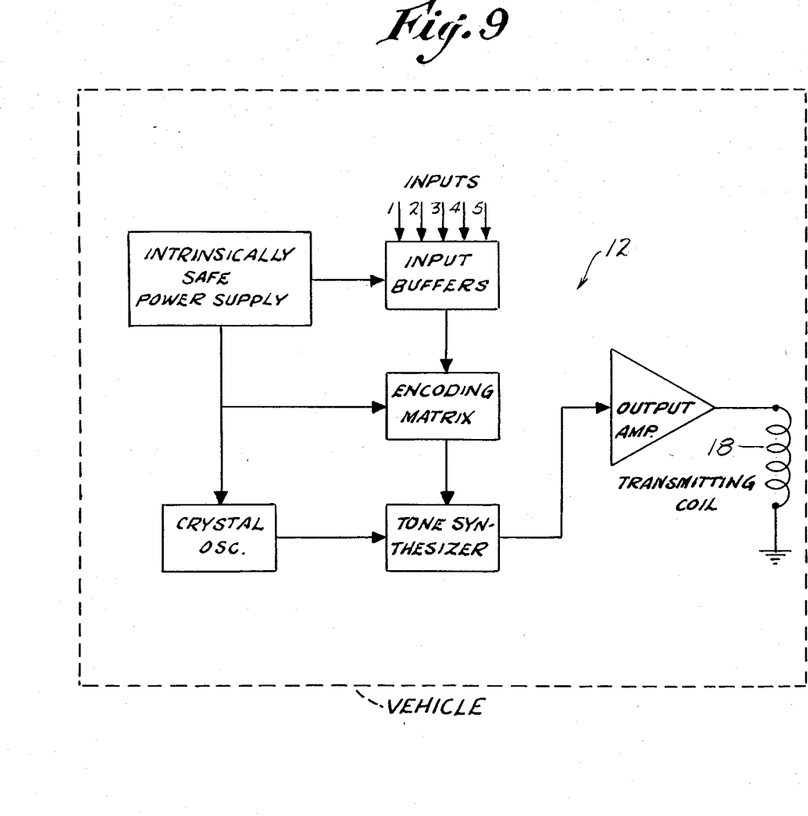
FIG. 9 is a block diagram similar to that of FIG. 5 but having more detail.
Figure 10:
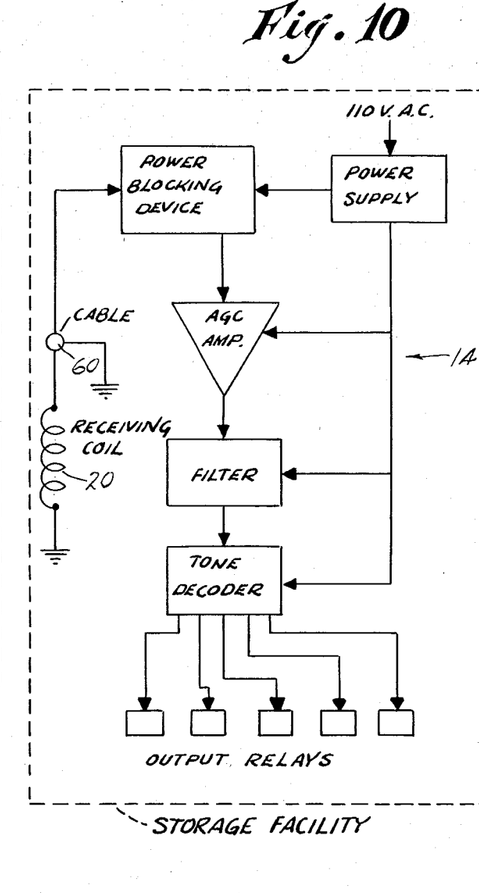
FIG. 10 is a block diagram similar to that of FIG. 6 but also having more detail.

Considering now FIGS. 1, 7 and 9, a transmitting coil 18 which receives energy from the transmitter 12 is located at the vehicle, and a receiving coil 20 is arranged to cooperate with the transmitting coil 18 when the two are brought into close proximity with each other. As seen in FIG. 1, the transmitting coil 18 is mounted in a metal housing or enclosure 22 on the vehicle, said housing having an opening 24 through which a cable (not shown) can pass, for connection to the leads of the coil. The coil 18 is wound on a bobbin 26 and has leads 28, 30 (FIG. 4) that extend to a terminal strip 32. Connection to the coil 18 is made by bringing the leads from the cable to the terminal strip. Carried by the housing 22 is a metal plate 34 of magnetic material such as steel, which constitutes a keeper part of the coupling assemblage, and an annular gasket 36 that can function as a seal for the plate. Attached to the plate 34 is a mounting tube 38 in which the transmitting coil 18 is carried. The coil 18 is shown as encapsulated in epoxy plastic, indicated by the numerals 40, 42 and a magnetic core in the form of a bolt 44 is mounted at the center of the coil, being also embedded in the epoxy 42. The bolt 44 is axially aligned with the coils 18, 20 and improves the magnetic coupling between the same since it is constituted of steel or iron.

The receiving coil 20 is somewhat similar in construction to the transmitting coil 18, being carried on a bobbin 48 with connections being made by means of insulated feed-through conductors 50, 52. Leads 54 and 56 extend from the feed-through conductors 50, 52 and terminate in a cable 60 that is shown as being of the coaxial type, having a center lead 62 and a shield lead 64.

In accordance with the present invention the receiving coil 20 is carried in a metal housing or shell 66 constituting a shield and which contains a permanent magnet 68 that is illustrated as being of generally annular configuration. Connected to the shell 66 is a first, large-diameter tube 70 and an additional or second, smaller diameter tube 72, the latter being of considerably greater length than the tube 70. The space or area between the tubes 70 and 72 is shown as being filled with epoxy plastic, labelled 74.

The connection cable 60 passes through a hole 76 in the tube 72, and the latter carries a threaded fitting or nut 78, providing a finished appearance. The nut 78 has a bore 80 through which the cable 60 passes, as shown. The receiving coil 20 is also encapsulated in epoxy resin having the shape of an annulus, with a central opening 84.

The above arrangement constitutes a separable, signal-coupling device whereby the transmitting coil 18 and receiving coil 20 can be disposed in close, coaxial relation to each other as the housings 66 and 22 are brought together. An effective magnetic coupling will exist between the coils, and the strong magnetic attraction between the magnet part 68 and the keeper part 34 will keep the housings 22 and 66 held to each other and maintained against appreciable separating pulls.

In accordance with the invention, the housing 22 provides an effective magnetic shield for the coil 18, and the housing 66 likewise provides an effective magnetic shield for the receiving coil 20 when the coupling is assembled. Actually, both housings act together in effecting the shielding, as well as the tubes 70 and 72, whereby there exists very little likelihood of the receiving coil 20 picking up stray magnetic fields or responding to false or spurious signals.

As the housing 66 is brought toward the housing 22, the magnet 68 will have a position wherein its outer face is in continuous intimate engagement with the keeper part or plate 34. Once the housings are thus brought together, they will remain securely in assembled relation under the attraction of the magnet 68 to the keeper part 34 and will strongly resist forces tending to separate them. However, when sufficient separating force is applied of course, the coupling parts can be readily pulled apart without damage.

The above construction is seen to have the following advantages: Since there are no separable contacts (as for example spring fingers or prongs) there is eliminated any hazard resulting from make-and-break arcing or sparking. This is especially important in situations where the transfer of volatile fluids, such as gasoline, liquefied natural gas and a variety of other petroleum products is to be carried out.

As already mentioned above, in accordance with the invention when the housings 22 and 66 are assembled, the two parts create an effective magnetic shield which virtually completely surrounds the coils 18 and 20, minimizing interference from external fields and at the same time minimizing undesirable radiations which might be emitted from the transmitting coil 18.

The magnet 68 and the keeper plate 34 constitute mutually attractive holding means on the housings, which are force-release responsive so as to permit virtually instantaneous separation of the housings in the event that the vehicle is inadvertently driven off while the housings are still operatively juxtaposed. The magnet part 68 provides a substantially constant magnetic flux which can be relied on over a long period of use. The epoxy surrounding the receiving coil 20 is disposed in the central opening of the magnet and has a bore or hole that is aligned with the bore of the receiving coil. A threaded boss 85 is received in threads of the tube 72 to mount the latter, and a screw 87 passes through an opening in the housing 66 to attach the boss 85 thereto.

The above arrangement is both simple in construction and reliable in operation. No complicated special parts are required, and the components making up the connector are straightforward and do not necessitate unusual manufacturing or assembly procedures.

Due to the fact that both the transmitting and receiving coils are completely encapsulated by the respective epoxy casings, no deterioration of the coils will occur with time, since these parts will not be exposed to any corrosive atmospheres, such as salt spray, soot, smoke etc., or chemical-laden moistures of the type commonly found in areas where refining or storage facilities are normally located.

The present invention further provides unique electronic circuitry for producing waveforms, preferably in the audio frequency range, at the vehicle and for encoding said waveforms to convey desired signal information to the transmitting coil, and unique receiving circuitry connected to the receiving coil for receiving the encoded signals and decoding the same so as to produce useful data at the storage facility.

Accordingly, a detailed schematic circuit diagram of the transmitter circuit as provided by the invention is illustrated in FIG. 7, with the corresponding detailed block diagram of the transmitter being illustrated in FIG. 9. It is noted that in the schematic circuit diagrams of FIGS. 7 and 8, the return or negative side of the circuit, which may or may not be an earth ground, is indicated by downwardly facing arrows which designate the connection to this negative side. The transmitter circuit generates a composite signal comprising two A. C. waveforms that can have different relationships corresponding respectively to different predetermined combinations of digital input signals that are received from electronic controls or sensor devices located at various points on the vehicle and providing switch closures or other digital information relating to such parameters as an overfill condition, the vehicle odometer reading, the integrity of the connection of a vapor recovery line, or the open/closed condition of vent lids, etc.

In carrying out the above, there is provided a plurality of input terminals on the transmitter, connected respectively to a plurality of input or buffer stages which accept the signals from the sensors on the vehicle. The input terminals are designated by the numerals 90, 92, 94, 96 and 98. In the disclosed embodiment of the invention, the controls that feed the above terminals are intended to be merely switch closures to ground as derived from float switches, interlock switches, limit switches, etc., but as can be readily understood, other types of controls could be employed, such as various forms of electronic gates, or relays.

By way of example, the terminal 90 could be connected to monitor the proper setting of the vehicle brake. Similarly, terminal 92 could verify the proper attachment of a vapor recovery line, with terminals 94 and 96 being connected to monitor the open or closed condition of a vent lid and the vehicle odometer's reading, respectively. In the present instance, the inputs are self powered, i. e. no outside power source is required, only a closure to ground. Specifically, terminal 98 is intended to be connected to a float switch that is disposed near the top of the tank, and which can monitor an overfill condition, as will be explained later on. In FIG. 7, there are shown typical switches, indicated by the numerals 100, 102, 104, 106 and 108, which could be considered the sensors disposed at various locations about the vehicle.

The terminals 90–96 are connected to current limiting resistors 110, 112, 114 and 116 which lead to the inputs of inverter amplifiers or buffers 118, 120, 122 and 124, respectively. Biasing resistors 125, 127, 129 and 131 extend respectively from each buffer to a positive source of D. C. voltage, indicated +V and derived from a power supply to be described below.

The outputs of the amplifiers 118-124 drive light emitting diodes (LEDs) 126, 128, 130 and 132, respectively having corresponding current limiting resistors 134, 136, 138 and 140. Load resistors 142, 144, 146 and 148 respectively extend to the positive supply line, +V. The output lines from the amplifiers 118-124 are indicated by the numerals 1, 2, 3 and 4, respectively. These lines also connect with the inputs of additional inverter amplifiers or buffers 150, 152, 154 and 156, respectively, which drive light emitting diodes 158, 160, 162 and 164, respectively, having associated current limiting resistors 166, 168, 170 and 172. The outputs of the amplifiers 150-156 are designated 1, 2, 3 and 4, respectively. The leads which power the amplifiers 118-124 and 150-156 have been purposedly omitted from FIG. 7, for clarity.

As indicated in FIG. 7, the signals from the amplifiers 118-124 and 150-156 are fed to the similarly labelled inputs of a series of NAND gates 174, 176, 178, 180, 182, 184, 186 and 188. The actual connections here have been omitted from the figure for the sake of clarity and simplicity.

The outputs of the NAND gates 174-188 are brought to an integrated circuit tone synthesizer generally indicated by the numeral 190, which is powered through a resistor 192 that connects to the +V line. The negative or return supply line is indicated in the figure by the number 194. The unit 190 includes an oscillator (not shown) having a crystal 196, and internal frequency dividing circuitry (not shown). The input lines are indicated at 196, 198, 200, 202, 204, 206, 208 and 210. The synthesizer 190 produces a combination of two audio waveforms or signals of different frequencies according to the nature of the digital information appearing on the input leads 196-210.

The output line 212 drives a buffer 214 through a resistor 216. The buffer stage has a collector resistor 218 and a load consisting of the transmitting coil 18 connected across output terminals 220, 222. A diode 224 across the coil 18 prevents damage to the stage 214 from inductive spikes.

The tone synthesizer 190 has an input line 226 which is constituted as an enable/disable line for the unit. In the event of a high digital signal applied to the line 226, the synthesizer 190 is placed in the enable mode and can operate normally. When a low digital signal is applied, the synthesizer 190 is disabled, removing the output on line 212.

As mentioned above, terminal 98 is intended to be connected to the overfill float switch, indicated 108. A series resistance 228 connects to the junction of resistors 230, 232, which latter feeds the input of a buffer 234 whose collector is connected to the enable/disable line 226. Resistor 236 functions as a load. The collector of the stage 234 feeds the input of another amplifier 238 having at its output a load resistor 240 and a light emitting diode 242 with associated current limiting resistor 244. The output of amplifier 238 drives another amplifier stage 246 having a load resistor 248, and a light emitting diode 250 with current limiter 252.

Grounding of the input terminal 98 through switch 108 shuts off stage 234, thus permitting a high level to be applied on line 226 through resistor 236. This in turn results in the LED 242 being illuminated, since amplifier 238 inverts the high input. Also, amplifier 246 is an inverter, so that LED 250 is extinguished. If an overfill condition occurs, the switch 108 opens, and the input terminal 98 is allowed to float. This enables stage 234 to turn on, causing LED 242 to be extinguished and LED 250 to be illuminated. LED 242 is preferably green, indicating a safe or non-overfill condition, whereas LED 250 is red, corresponding to an overfill situation.

Also, provision is made for control of an external circuit that is intended to be activated in the event of overfill. In accomplishing this, the output line of the stage 234 is connected through a resistor 254 to another stage 256 having as its load, a relay coil 258. Relay contacts 260 and a fuse 262 lead to output lines 264 and 266. This arrangement gives complete isolation from the remainder of the circuitry shown in FIG. 7. A protective diode 268 is connected across the coil 258, for spike suppression.

The power supply for the transmitter is also illustrated in FIG. 7, comprising a pair of terminals 270, 272, adapted to be connected to the vehicle electrical supply or storage battery (not shown), having polarity protection in the form of a diode 274, a fuse 276, limit resistor 278, integrated circuit voltage regulator 280, filter capacitors 282, 284, and shut-down or limiter stages comprising zener diodes 286, 288, resistors 290, 292, and power transistors 294, 296. A supply voltage monitor in the form of an LED 298 is provided, with associated limiter resistor 300. The LED 298 can preferably be yellow, in order to indicate that voltage is present on the line +V, thereby to facilitate verification of proper operation of the unit and to assist in troubleshooting, if needed.

Figure 8:
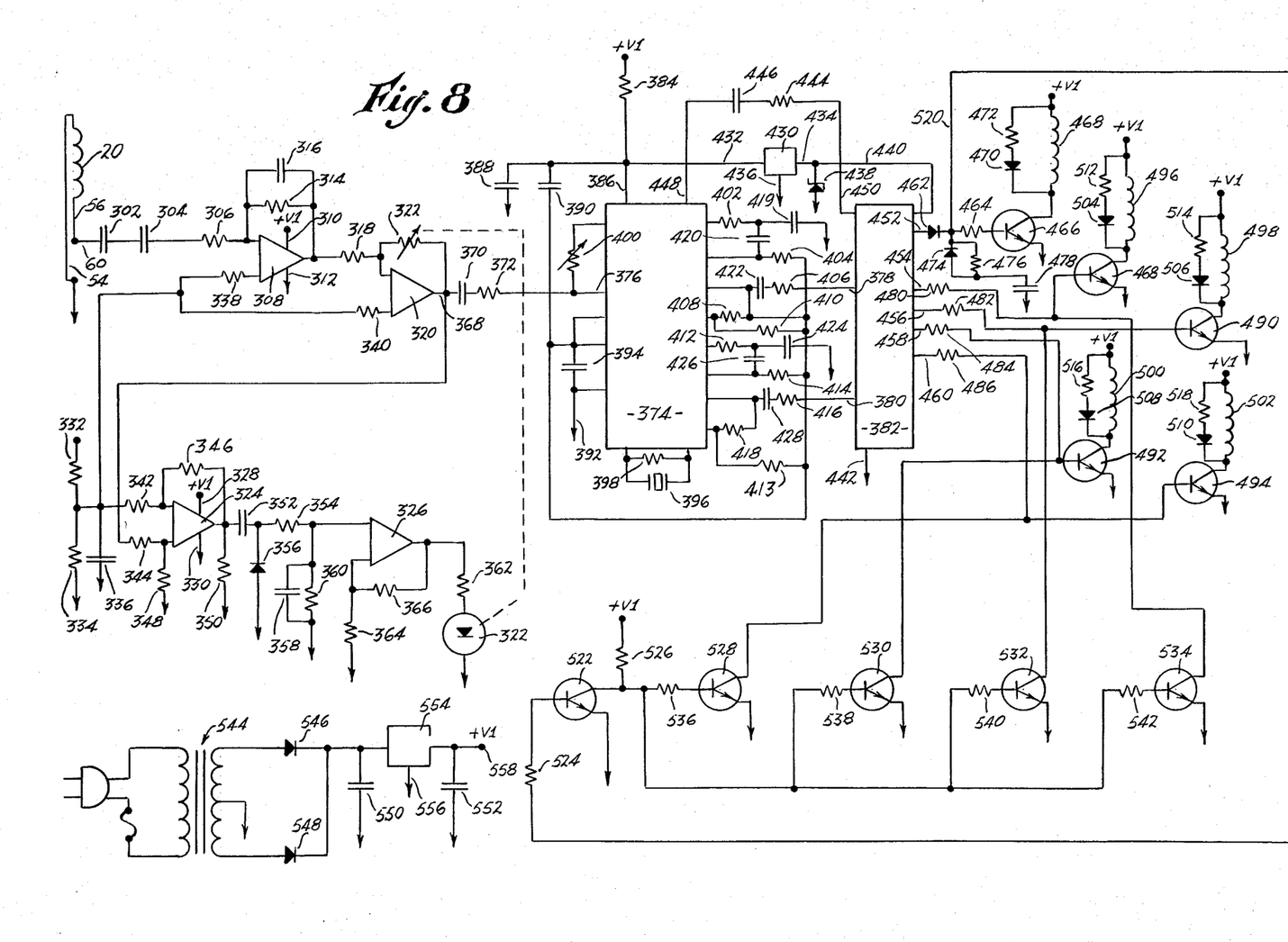
FIG. 8 is a detailed schematic diagram of the receiving portion of the system.

FIG. 8 is a detailed schematic diagram of the receiver unit, which is intended to be located at the storage facility where the vehicle is being loaded. As indicated above, the signal from the transmitting coil 18 is in the form of two A. C. waveforms of distinct frequencies. Preferably in the present arrangement, they are both sine waves. These signals are inductively coupled to the receiving coil 20 and pass through the cable 60 to a pair of series connected capacitors 302, 304, which guard against the application of voltage to the cable 60 in the event of malfunction of any circuitry in the receiver. Thus there is eliminated a hazard which might otherwise exist with respect to sparking beyond the capacitors. The inductively coupled signals are fed through an input resistor 306 to an amplifier 308 having supply lines 310, 312. Negative feedback and frequency compensation are provided by resistor 314 and capacitor 316, and the resulting output signal is coupled through resistor 318 to a second amplifier 320 having a variable resistance feedback element 322 which is part of an optical coupler, to be described below. Feedback control for the amplifier 320 is provided by additional amplifiers 324, 326. Supply lines 328, 330 power the unit 324. Similar supply lines for amplifiers 320 and 326 are not shown, since in the present instance, amplifiers 308 and 320 are of the integrated circuit type, contained in a single package with common supply leads. The same is true of amplifiers 324 and 326. Input biasing for the amplifiers 308 and 320 is established by resistors 332 and 334. A by-pass capacitor 336 extends from the junction of resistors 332 and 334 to the negative side of the circuit. Resistors 338 and 340 apply input bias to amplifiers 308 and 320 respectively. Resistors 342, 344, 346 and 348 establish the gain of the amplifier 324. The amplifier 324 has a load resistor 350, and the output is applied through a coupling capacitor 352 and resistor 354 to amplifier 326. Associated with the capacitor 352 is a diode 356 which rectifies the A. C. signal from the output of amplifier 324 and applies it to the stage 326. Capacitor 358 filters the rectified wave, and resistor 360 is a bleeder or leak. The output of amplifier 326 drives the light emitting portion or diode of the optical coupler 322 through resistor 362. Associated with the amplifier 326 are resistors 364 and 366. Variation in the intensity of light emitted by the light emitting diode results in a change in the resistance of the feedback element of amplifier 320, which in turn controls the voltage gain thereof. The amplifiers 308, 320, 324 and 326, and associated circuitry thus form an automatic gain control which accepts a relatively wide range of input signal amplitudes and varies the amplification in order to provide a relatively constant output amplitude regardless of the magnitude of the input. The AGC regulated signal on output line 368 of amplifier 320 is then coupled through capacitor 370 and resistor 372 to a digital filter and signal splitter generally designated 374, having an input line 376.

The digital filter 374 eliminates any unwanted frequencies, and in addition splits up the signal on the input line 376 into its individual components, that is, two audio frequencies which are applied to the inputs 378, 380 of a tone decoder unit 382 to be described below. Power to the filter 374 is applied through a de-coupling resistor 384 to line 386, and by-pass capacitors 388 and 390 are connected to this supply line, as shown. The negative supply line is indicated at 392. Capacitor 394 is also a by-pass.

The filter includes a crystal oscillator (not shown) having a crystal 390 and resistor 398, and various other filtering and/or biasing components that are associated with the particular unit, including resistors 400, 402, 404, 406, 408, 410, 412, 413, 414, 416 and 418, and capacitors 419, 420, 422, 424, 426 and 428.

Also connected to the resistor 384 is an integrated circuit voltage regulator 430 having an input 432, output 434, and negative or common lead 436. A zener diode 438 provides overvoltage protection, and the resultant regulated D. C. is applied to the supply line 440 of the tone decoder 382. The common lead of this unit is designated 442. A portion of the signal generated by the crystal oscillator (which includes crystal 396) in the filter and signal splitter unit 374 is coupled to the decoder 382 by means of a series resistor 444 and capacitor 446 connected between lead 448 of the filter and splitter 374, and lead 450 of the decoder 382, as shown. This coupled signal is employed in the decoding process.

A total of five outputs is provided by the tone decoder in the present arrangement, these appearing on leads 452, 454, 456, 458 and 460. Whenever a valid combination of two input audio frequencies is applied to the inputs 378 and 380 of the tone decoder 382, there appears on lead 452 a high level digital voltage which passes through diode 462 and resistor 464 to stage 466. The emitter of this stage is connected to the common line as shown, and the high level at its input renders it conducting, thus energizing a relay coil 468 in its collector, and also causing illumination of an LED 470. A series resistor 472 limits the current through the LED to a safe value. Associated with the stage 466 are an additional diode 474, resistor 476 and capacitor 478.

The remaining outputs 454, 456, 458 and 460 assume either high or low digital levels according to the nature of the audio waveforms being received by the decoder 382 on lines 378 and 380. That is, for each individual pair of waveforms received, there exists a unique combination of digital output signals on the leads 454-460. These leads extend to resistors 480, 482, 484 and 486, which in turn drive transistor switches 488, 490, 492 and 494, respectively. The emitters of each of the above stages are connected to the common side of the circuit as shown, and in their collectors are relay coils 496, 498, 500 and 502, respectively. In addition, each collector circuit contains an LED, numbered 504, 506, 508 and 510, respectively, with associated resistors 512, 514, 516 and 518. These stages are supplied from the leads indicated +V1, this voltage being derived from a power supply to be described briefly below.

From the output lead 452, through diode 462, there extends a line 520 which drives an inverter stage 522 through a resistor 524, the stage having a load resistor 526. This stage is powered by the same supply, indicated +V1. The output of the stage 522 in turn drives four additional clamping stages, indicated 528, 530, 532 and 534, respectively, through resistors 536, 538, 540 and 542. The collectors of these last four stages are connected to the bases of the stages 494, 492, 490 and 488, respectively. Normally the stages 528, 530, 532 and 534 are off, that is, their collectors are open so that no clamping off of the stages 488, 490, 492 and 494 occurs. This condition results from the high level that appears on lead 452 when a valid input signal is being received on lines 378 and 380 of the decoder 382. Under these circumstances, stage 522 is conducting, which keeps stages 528-534 off. In the event that no valid signal is being received on leads 378 and 380, the output on lead 452 will assume a low digital level, resulting in shutting off of the stage 522 and turning on of the stages 528-534. This in turn clamps off the stages 488-494, and prevents them from inadvertently triggering on noise or other spurious signals when no valid signal is present.

FIG. 8 further shows the power supply employed with the present apparatus, namely the receiver part thereof. A. C. is applied to a transformer 544, having a full wave rectifier 546, 548, filter capacitors 550, 552, and integrated circuit voltage regulator 554 with a common lead 556. Output indicated by the designation +V1 appears on the lead 558, and is applied to the similarly marked leads elsewhere on FIG. 8. The present supply is of conventional construction, and as such forms no part of the present invention.

In the operation of the circuit, and referring to FIGS. 7 and 8, the various parameters that are being monitored on the vehicle will give rise to digital input signals on the leads 90, 92, 94, 96 and 98. As noted above, these levels or signals are typically in the form of switch closures to ground, and for each combination of input signals, there will be produced, by the tone synthesizer or generator 180, a pair of audio signals at the output 202, which in turn will be amplified and applied to the transmitting coil 18. With the transmitting coil 18 juxtaposed to the receiving coil 20, this two-tone audio signal will be inductively coupled to or picked up by the coil 20, and amplified by the stages 308 and 320 in FIG. 8. The gain of the stage 320 is automatically controlled by the feedback system comprising amplifiers 324 and 326, in order to provide a relatively constant output signal on lead 368 regardless of the magnitude of the input signal being received by the receiving coil 20.

The two-tone signal is applied to the digital filter 374 which removes any spurious components or unwanted signals and at the same time splits the two audio tones into their component parts, applying them to the terminals 378 and 380 of the tone decoder 382. This decoder produces a high D. C. level on lead 452 at any time during which a valid combination of input audio signals are being received on leads 378 and 380. In addition, the outputs from the tone decoder 382 appearing on leads 454, 456, 458 and 460 will be either high or low, depending on the frequencies of the tones on lines 378 and 380. Assuming that the high level on line 520 maintains the clamping stages 528–534 off, the relay coil 468 and associated LED 470 will be energized, and certain of the coils 496–502 will be energized, with their corresponding LEDs, according to the digital information appearing on the lines 454–460. This information will correspond to that which is applied to the leads 90–96 of the transmitter which is located on the vehicle, and thus there will be obtained an indication of the condition of the various vehicle parameters at the location of the receiver. As can be readily understood, the relay coils 468, 496, 498, 500 and 502 can be employed to close relay contacts, either singly or in pairs, to effect the desired control of indicator lights, warning buzzers, locking of hatch lids, or swing gates, etc. Through the use of relays at the output, virtually complete isolation of the equipment being controlled can be achieved, thereby minimizing interaction with the receiver circuitry, and eliminating or minimizing the possibility of malfunctioning thereof as a result of coupling of undesired signals thereto, from other equipment at the storage facility where the present apparatus is being employed.

In FIG. 7, the stages 294 and 296 provide protection for the circuitry of the transmitter in the event that the voltage regulator 280 suffers a failure (such as a short circuit between its output terminal and its input terminal), which would result in an overvoltage condition on the output line +V. The zener diodes are of such voltage rating that they are non-conductive when the nominal output voltage +V is applied to them. Accordingly, the stages 294 and 296 are normally shut off. In the event of an overvoltage, the zener diodes conduct, and turn on one or both of the stages 294 and 296, which then causes fuse 276 to blow. The reason for employing two transistor stages is merely to provide duplicate or back-up protection, which greatly enhances the reliability. Under normal operating conditions, the stages 294 and 296 are non-conducting, that is, their collectors are open circuited as far as the +V line is concerned.

The present invention also embraces the method of remotely monitoring at a product storage facility, digital information in the form of digital input signals relating to various parameters characterizing a product-carrying vehicle, such signals being of a type that are generated on separate lines and preferably are in the form of switch closures to ground as, for example, produced by the switches 100, 102, 104, 106 and 108 in FIG. 7. The method comprises the steps of applying the digital information from terminals 90, 92, 94, 96 and 98 to a waveform decoder 190 so as to produce, for each possible combination of digital input signals, a unique pair of alternating current signals of different discrete frequencies, applying the alternating current signals to a transmitting coil 18 disposed on the vehicle, physically positioning a receiving coil 20 that is associated with the storage facility adjacent to the transmitting coil 18 in inductively coupled relation and in a force-release manner so as to enable a non-destructive separation of the coils 18, 20 to take place in the event that the vehicle is inadvertently driven off while the receiving coil 20 is in its operative position adjacent to the transmitting coil 18, and applying the received pair of alternating current signals to a tone decoder 382 so as to produce, on multiple output lines 452, 454, 456, 458 and 460 thereof, combinations of digital levels which correspond uniquely with each combination pair of alternating current signals received, so as to indicate, at the storage facility, the parameters that characterize the vehicle. Typical information relating to the vehicle and which is being monitored and applied to terminals 90, 92, 94, 96 and 98 has been given above.

The method further includes the steps of passing the received alternating signals through a sharp cutoff bandpass filter and tone separating device 374 in order to eliminate unwanted and spurious frequencies that might otherwise interfere with the operation of the tone decoder 382.

Also characterizing the method is the step of passing the received alternating current signals from the coil 20 through a power blocking device such as the series connected capacitors 302, 304 in order to prevent possible damage to the following circuitry, resulting from possible high level signals or spikes from the coil 20. Also, by the present invention, the received signals are passed through an automatic gain control circuit, comprising amplifiers 308, 320, 324 and 326, and their associated circuitry, in order to provide a substantially more constant output for relatively wide variations in input signals being received by the coil 20.

In the appended claims, the term encoding matrix is intended to comprise the output terminals of the amplifiers 118–124, 150–156, and the NAND gates 174–188. A transient suppression device is provided at the output of the decoder 382, in the form of the diode 474, resistor 476 and capacitor 478. This network operates to protect the output line 452 from spikes that might appear on the collector of transistor 466, and which could forward bias the collector-base junction thereof and pull down the line 452 to an excessively negative voltage, sufficient to cause damage to the unit.

Figure 11:
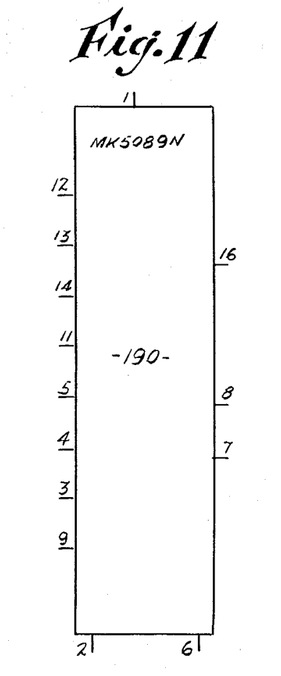
FIGS. 11, 12 and 13 are enlarged diagrams of the integrated circuits utilized, showing the respective terminal numbers.
Figure 12:
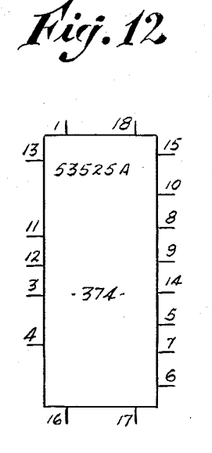
Figure 13:
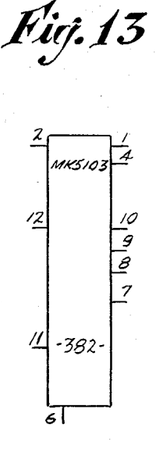

FIGS. 11–13 show respectively the tone synthesizer 190, filter and signal splitter 374, and tone decoder 382, and their associated pin numbers in the locations in which they appear in the detailed schematic diagrams of FIGS. 7 and 8. Unit 190 may be an integrated circuit manufactured by Mostek, type MK 5089N. The devices 374 and 382 can by type 53525A made by AMI, and type MK 5105, made by Mostek, respectively. The pin numbers shown in FIGS. 11–13 correspond to those of these units.

Typical component types and values for the schematic circuit diagrams are given below, with manufacturers being specified, where appropriate.

In FIG. 7, amplifiers 118, 120, 150 and 152 can be contained in a single package, type 75492 manufactured by Texas Instruments. Amplifiers 122, 124, 154, 156, 238 and 246 can be similarly carried in a single package, type 75492, same manufacturer. NAND gates 174, 176, 178 and 180 may be in a single package, type 74C30 made by National Semiconductor. The same is true of the gates 182, 184, 186 and 188. Voltage regulator 280 is a type 7808, made by Texas Instruments, National Semiconductor, Motorola, and others. Transistors 294 and 296 are type 2N3055, and transistors 214 and 256 are type 2N4401. Zener diodes 286 and 288 can be type 1N4738A. Diode 274 is a 1N4001, and diodes 224 and 268 are 1N4148.

Resistors 110, 112, 114, 116, 192, 218, 228, 290 and 292 are all 100 ohms. Resistors 125, 127, 129, 131 and 236 are 4700 ohms. Resistors 134, 136, 138, 140, 166, 168, 170, 172, 244, 252 and 300 are 220 ohms. Resistors 142, 144, 146, 148, 240 and 248 are 1200 ohms. Resistors 216, 230 and 254 are 10K ohms. Resistor 232 is 1000 ohms, and resistor 278 is 5.1 ohms. Capacitors 282 and 284 are each 0.1 uF.

In FIG. 8, amplifiers 308 and 320 can be contained in a single package, type LM2904, made by National Semiconductor. The same is true of amplifiers 324 and 326, which are of the same type. Voltage regulator 554 is a type 7812, manufactured by National Semiconductor, Motorola, Texas Instruments, Fairchild Semiconductor, and others. Regulator 430 is a 78L05, made by National Semiconductor, Motorola, Fairchild Semiconductor, Texas Instruments, and others. All transistors in FIG. 8 are type 2N4401. Zener diode 438 is rated at 5.1 volts. Diodes 356, 462 and 474 are type 1N4148, and diodes 546 and 548 are type 1N4001. Device 322 is an opticoupler, made by Clairex. Resistors 350, 362, 402, 476 and 526 are all 1000 ohms. Resistors 306, 318, 332, 334, 354, 372, 480, 482, 484, 486, 536, 538, 540 and 542 are 10000 ohms. Resistors 338, 340, 342, 344, 346, 348, 360 and 366 are 100K ohms. Resistors 512, 514, 516 and 518 are 820 ohms. Resistors 419, 464 and 524 are 2200 ohms. Resistors 406 and 416 are 330K ohms. Resistors 404 and 414 are 20K ohms. Resistors 408 and 418 are 680K ohms. Resistor 384 is 68 ohms. Resistor 472 is 330 ohms. Resistor 314 is 51K ohms. Resistor 364 is 600 ohms, and resistor 314 is 51K ohms. Resistor 400 is 2500 ohms, variable. Capacitors 302 and 304 are 0.0047uF. Capacitors 419 and 424 are 470uuF. Capacitor 352 is 0.01 uF. Capacitors 422, 428 and 446 are 0.05 uF. Capacitors 336, 370, 420, 426 and 552 are 0.1 uF. Capacitors 358, 390 and 394 are 1 uF. Capacitor 478 is 10 uF. Capacitor 388 is 22 uF. Capacitor 550 is 1000 uF.

It will now be seen from the foregoing that I have provided a novel and improved inductively coupled signalling system having special advantages in connection with the handling of flammable products such as gasoline, liquefied gas, etc., particularly with regard to the transfer of such products from a large storage facility to vehicles. An important safety feature resides in the separable inductive coupling between the electronic system on the vehicle and that at the storage facility. The electronic circuitry is capable of handling a multiplicity of parameters about which information must be had to insure the fast and safe transfer of the product. The system is especially reliable, and is characterized by small physical size of the various related components.

The separable inductive coupling is not critical as to the direction of pull required to separate the parts. That is, separation of the connector parts can be effected by a force exerted in an axial direction on the one housing, as well as forces exerted obliquely with respect to this axis, all without giving rise to damage or deterioration of the separable parts.

Each and every one of the appended claims defines an aspect of the invention that is separate from all others, and accordingly each claim is to be treated in this manner when examined in the light of the prior art, in any determination of novelty or validity.

Variations and modifications are possible without departing from the spirit of the claims.

What is claimed is
1. In a safety signalling system for exchanging information between a vehicle and a storage facility, a separable, signal-coupling device comprising in combination:
 (a) a signal transmitting coil,
 (b) means including a housing, for mounting said transmitting coil at an accessible location on the vehicle,
 (c) a signal receiving coil and a housing surrounding the same, said housings being adapted for operative juxtaposition to each other so as to locate the said coils in inductive relation,
 (d) mutually attractive holding means on said housings, including a magnetic keeper part on one of said housings and a magnet part on the other housing, for releasably holding the said housings in said operative juxtaposition,
 (e) said receiving coil housing and one of the parts of said holding means constituting a substantially complete magnetic shield for the receiving coil to minimize stray pick-up of spurious signals thereby, and
 (f) said holding means on the housings being force-release responsive so as to permit virtually instantaneous separation of the housings in the event that the vehicle is inadvertently driven off while the housings are still operatively juxtaposed.

2. The invention as defined in claim 1, wherein:
 (a) said magnet part provides a substantially constant magnetic flux.

3. The invention as defined in claim 1, wherein:
 (a) said magnet part comprises a permanent magnet.

4. The invention as defined in claim 1, wherein:
 (a) said magnet part is of annular configuration.

5. The invention as defined in claim 1, wherein:
 (a) said keeper part comprises a metal plate disposed adjacent to said transmitting coil,
 (b) said magnet part being of annular configuration and closely abutting the metal plate when the housings are brought together.

6. The invention as defined in claim 1, wherein:
 (a) said receiving coil is encapsulated in an epoxy casing,
 (b) said magnet part being annular and disposed adjacent to said receiving coil,
 (c) the epoxy casing being located in the opening of the magnet part.

7. The invention as defined in claim 1, and further including:
 (a) an electric cable connected with said receiving coil at said storage facility, for carrying signals to the latter.

8. The invention as defined in claim 1, wherein:
 (a) both the transmitting coil and the receiving coil are annular, and adapted to be in axial alignment with one another when the housings are brought together, and
 (b) means providing a magnetic core adjacent the axes of the transmitting and receiving coils, for improving the magnetic coupling between said coils.

9. The invention as defined in claim 8, wherein:
 (a) said magnetic core comprises a metal screw having its head intermediate the centers of the transmitting and receiving coils.

10. The invention as defined in claim 1, wherein:
 (a) said transmitting coil is encapsulated in an epoxy casing,
 (b) a magnetic core comprising a metal screw threaded into the casing,
 (c) said metal screw improving the magnetic coupling between said transmitting and receiving coils.

11. The invention as defined in claim 7, and further including:
(a) feed-through conductors connected with said receiving coil and extending through the wall of the receiving coil housing,
(b) said feed-through conductors being electrically connected with and disposed intermediate said receiving coil and said electric cable.

12. The invention as defined in claim 1, and further including:
(a) signal transmitting means located at the vehicle and connected to said signal transmitting coil, to effect excitation of the same, and
(b) signal receiving means located at the storage facility, connected to said signal receiving coil to respond to signals picked up by said coil.

13. The invention as defined in claim 12, wherein:
(a) said transmitting means includes a waveform generator,
(b) said receiving means including a device for extracting and utilizing signal information from the waveforms of said generator.

14. The invention as defined in claim 13, wherein:
(a) the means for generating the waveform comprises switches.

15. The invention as defined in claim 13, wherein:
(a) the receiving means comprises relays responsive to the waveform information.

16. A signalling system to provide information from a carrier vehicle to a storage facility, comprising in combination with said vehicle and facility:
(a) a device at said vehicle, for generating waveforms,
(b) means for selecting two of said waveforms to correspond to a predetermined signal,
(c) a two-part coupling, one part comprising means connected to said generating device for radiating the waveform energy therefrom, and the other part comprising means closely coupled to said radiating means, to pick up said radiated waveform energy,
(d) holding means for normally maintaining said radiating and pick up means in close, operative proximity,
(e) said holding means enabling a non-destructive separation of said waveform radiating and pick up means in response to the application of sufficient force to said coupling parts,
(f) a cable connected to said pick up means, for carrying said picked up waveforms,
(g) a waveform decoder at the said storage facility, associated with said cable for decoding the waveforms carried by the cable, and
(h) a control device at said storage facility, responsive to said decoded waveforms.

17. The invention as defined in claim 16, wherein:
(a) the device for generating waveforms comprises an oscillator and tone synthesizer,
(b) said means for selecting two of said generated waveforms comprising an encoding matrix connected to and controlling said tone synthesizer.

18. The invention as defined in claim 16, and further including:
(a) a filter device connected to the waveform decoder and feeding signals thereto.

19. The invention as defined in claim 17, and further including:
(a) a plurality of input terminals at said vehicle, for connection to condition-sensing devices, and
(b) input buffer devices connecting said input terminals to the said encoding matrix.

20. The invention as defined in claim 18, wherein:
(a) the waveform decoder is a tone decoder,
(b) said waveforms being in the audio range.

21. The invention as defined in claim 16, and further including:
(a) a power blocking device connected between said cable and waveform decoder,
(b) said waveforms being in the audio range.

22. The invention as defined in claim 16, and further including:
(a) an automatic gain control circuit connected between said cable and waveform decoder, providing a more constant output over a wide range of input amplitudes.

23. The invention as defined in claim 22, wherein:
(a) said automatic gain control utilizes an amplifier stage having a variable gain,
(b) said amplifier stage having associated with it an optical coupler which varies its resistance in order to vary the amplifier gain.

24. The invention as defined in claim 23, wherein:
(a) said optical coupler is connected in a negative feedback circuit of the said amplifier stage.

25. The invention as defined in claim 21, wherein:
(a) said power blocking device comprises a capacitor connected in a circuit in series with the said cable.

26. The invention as defined in claim 18, wherein:
(a) said filter device comprises a sharp cutoff bandpass filter.

27. The invention as defined in claim 16, wherein:
(a) said vehicle carries an overfill indicator monitor, and
(b) means associated with said overfill indicator monitor and said waveform generating device of the vehicle, for shutting down the generating device in the event that an overfill condition is sensed by the said overfill indicator monitor, thereby to prevent readings from occurring at the control device of the facility when an overfill condition exists.

28. The invention as defined in claim 16, and further including:
(a) a pair of visual indicators at said vehicle, and
(b) means for illuminating one of said indicators and for maintaining extinguished the other of said indicators when no overfill condition exists, and for illuminating the said other of said indicators and for maintaining extinguished the said one indicator when an overfill condition does exist.

29. The invention as defined in claim 16, wherein:
(a) said control device comprises multiple relays,
(b) means connected with an output of the waveform decoder, for maintaining the said relays in a de-energized state in response to the occurence of an overfill condition.

30. The invention as defined in claim 16, wherein:
(a) said control device comprises multiple visual indicators,
(b) means connected with an output of the waveform decoder for maintaining the said visual indicators in a de-energized state in response to the occurence of an overfill condition.

31. The invention as defined in claim 16, wherein:
(a) said control device comprises multiple relays, adapted to be energized by said waveform decoder, and (b) transient suppression means connected with an output of the decoder, for preventing induced voltages, resulting from switching of a relay coil, from damaging the decoder.

32. The invention as defined in claim 16, wherein:
(a) said waveform decoder is interposed between said cable and said control device, and has two input terminals adapted to receive a pair of said waveforms, one on each input.

33. The invention as defined in claim 32, and further including:
(a) means interposed between said cable and said waveform decoder, for splitting the picked-up waveforms into two parts, to be applied respectively to the said inputs of the decoder.

34. A method of remotely monitoring at a product storage facility, digital information in the form of digital input signals that are generated on separate lines and which relate to multiple parameters characterizing a product-carrying vehicle, comprising the steps of:
(a) applying said digital information on said separate lines to a waveform encoder so as to produce, for each possible combination of digital input signals, a unique pair of alternating current signals of different discrete frequencies,
(b) applying said alternating current signals to a transmitting coil disposed on the vehicle,
(c) physically positioning a receiving coil that is associated with the storage facility adjacent to the transmitting coil in inductively coupled relation thereto and in a force-release manner so as to enable a non-destructive separation of the coils to take place in the event that the vehicle is inadvertently driven off while the receiving coil is in its operative position adjacent to the transmitting coil, and
(d) applying the received pair of alternating current signals to a tone decoder so as to produce, on multiple output lines thereof, combinations of digital levels which correspond uniquely with each combination pair of alternating current signals received, so as to indicate, at the storage facility, the parameters that characterize the vehicle.

35. The invention as defined in claim 34, and including the further step of:
(a) passing the received alternating current signals through a filter in order to eliminate unwanted and spurious frequencies that might otherwise interfere with the operation of the tone de- coder.

36. The invention as defined in claim 34, and including the further step of:
(a) passing the received alternating current signals through an automatic gain control circuit in order to provide a more constant output over a wide range of input amplitudes.

37. The invention as defined in claim 34, and including the further steps of:
(a) passing the received alternating current signals through an automatic gain control circuit in order to provide a more constant output over a wide range of input amplitudes, and
(b).thereafter passing the received alternating current signals through a filter in order to eliminate unwanted and spurious frequencies that might otherwise interfere with the operation of the tone decoder.

38. The invention as defined in claim 34, and including the further steps of:
(a) passing the received alternating current signals through an automatic gain control circuit in order to provide a more constant output over a wide range of input amplitudes, and
(b) thereafter passing the received alternating current signals through a sharp cut-off bandpass filter in order to eliminate unwanted and spurious frequencies that might otherwise interfere with the operation of the tone decoder.

39. The invention as defined in claim 34, and including the further step of:
(a) passing the received alternating current signals through a power blocking device so as to prevent excessive signal amplitude from swamping circuitry following the same.

40. The invention as defined in claim 34, and including the further step of:
(a) applying the received pair of signals to a tone separating device prior to the applying of said received pair to the tone decoder, thereby to split the pair into their individual components.

41. A method of remotely monitoring at a product storage facility, information that is generated at a product carrying vehicle and which relates to multiple parameters that characterize the vehicle, comprising the steps of:
(a) generating a signal in a transmitter disposed on the vehicle and applying said transmitted signal to a transmitting coil disposed on the vehicle,
(b) physically positioning a receiving coil that is associated with the storage facility adjacent to the transmitting coil and in inductively coupled relation thereto, to enable the receiving coil to pick up said signal, said receiving coil being held in a force-release manner so as to enable a non-destructive separation of the coils in the event that the vehicle is inadvertently driven off while the receiving coil is in its operative position adjacent to the transmitting coil, and
(c) applying the signal from the receiving coil to a receiver and decoder, so as to provide an indication, at the storage facility, of the magnitude of the parameters that characterize the vehicle.

* * * * *